(12) United States Patent
Tysowski et al.

(10) Patent No.: US 7,797,679 B2
(45) Date of Patent: Sep. 14, 2010

(54) SYSTEM AND METHOD FOR PROVIDING A PARAMETER FOR AN APPLICATION OPERATING ON AN ELECTRONIC DEVICE

(75) Inventors: Piotr Tysowski, Waterloo (CA); Matthew Lee, Belleville (CA); Darrell May, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 1033 days.

(21) Appl. No.: 11/469,109

(22) Filed: Aug. 31, 2006

(65) Prior Publication Data

US 2008/0126957 A1 May 29, 2008

(51) Int. Cl.
*G06F 9/44* (2006.01)
*G06F 15/177* (2006.01)

(52) U.S. Cl. .................. 717/121; 717/120; 713/100; 709/220; 709/221; 709/222

(58) Field of Classification Search .............. 717/120, 717/121
See application file for complete search history.

(56) References Cited

U.S. PATENT DOCUMENTS

| | | | | |
|---|---|---|---|---|
| 5,930,699 A | * | 7/1999 | Bhatia | 455/456.3 |
| 6,115,611 A | * | 9/2000 | Kimoto et al. | 455/456.3 |
| 6,301,012 B1 | * | 10/2001 | White et al. | 358/1.15 |
| 6,343,360 B1 | | 1/2002 | Feinleib | |
| 6,591,373 B1 | * | 7/2003 | Ardis et al. | 714/7 |
| 6,775,559 B1 | * | 8/2004 | Weghorst et al. | 455/558 |
| 7,024,548 B1 | * | 4/2006 | O'Toole, Jr. | 713/1 |
| 7,457,628 B2 | * | 11/2008 | Blumberg et al. | 455/456.1 |
| 2002/0038362 A1 | * | 3/2002 | Bhatia et al. | 709/224 |
| 2002/0188778 A1 | * | 12/2002 | Iwanojko et al. | 710/104 |
| 2002/0198968 A1 | * | 12/2002 | Shirriff | 709/220 |
| 2003/0055529 A1 | * | 3/2003 | Aosawa | 700/220 |
| 2003/0101247 A1 | * | 5/2003 | Kumbalimutt et al. | 709/221 |

(Continued)

FOREIGN PATENT DOCUMENTS

WO    WO02/39210    5/2002

(Continued)

OTHER PUBLICATIONS

"Nokia 9300 smartphone User Guide" Copyright 2005, whole document.*

(Continued)

*Primary Examiner*—Thomas K Pham
(74) *Attorney, Agent, or Firm*—McCarthy Tétrault LLP

(57) ABSTRACT

The invention relates to a system, method and device for modifying a parameter for an application operating on an electronic device. The method comprises the steps of: (a) upon activation of the device, determining a state of initial configuration for the device; (b) if the state indicates that the device requires configuration, providing a GUI interface allowing for changes to be made to the parameter; and (c) if a change is made to the parameter through the interface, updating a storage location with the change. In the method, the device may have communication capabilities with a network; and time zone information relating to the location of the device may be provided from the network or from the device; and the time zone information may be used to update an aspect relating to the parameter.

18 Claims, 10 Drawing Sheets

U.S. PATENT DOCUMENTS

| | | |
|---|---|---|
| 2003/0103088 A1 | 6/2003 | Dresti et al. |
| 2004/0019670 A1* | 1/2004 | Viswanath ................... 709/223 |
| 2004/0098572 A1* | 5/2004 | Andrew et al. ................. 713/1 |
| 2004/0172622 A1 | 9/2004 | Francis |
| 2005/0015215 A1* | 1/2005 | Zhang ........................ 702/119 |
| 2005/0080598 A1* | 4/2005 | Iwanojko et al. ............ 702/188 |
| 2005/0232086 A1 | 10/2005 | Jiddou et al. |
| 2007/0045441 A1* | 3/2007 | Ashworth et al. ............. 236/94 |

FOREIGN PATENT DOCUMENTS

| | | |
|---|---|---|
| WO | WO02/077661 | 10/2002 |
| WO | WO2004/104618 | 12/2004 |

OTHER PUBLICATIONS

Nokia 9500 Communicator Bedienungsanleitung, Unknown, 2004.
Sony Ericsson K500 User's Guide, Sony Ericsson, 2004.
Online Review of Sony Ericsson K500i, Unknown, Oct. 18, 2004.

\* cited by examiner

SYSTEM AND METHOD FOR PROVIDING A PARAMETER FOR AN APPLICATION OPERATING ON AN ELECTRONIC DEVICE

FIELD OF THE INVENTION

The invention relates to providing a value to a parameter for an application operating on an electronic device. More particularly, the invention relates to a system and method for providing "set-up" parameter(s) to one or more (software/firmware/hardware) applications operating on a portable device (such as a wireless communication device), preferably upon initial activation of the device.

BACKGROUND

Mobile communication devices allow their users to communicate with others in more flexible ways and at more flexible times. Often devices are pre-loaded with a set of applications, including an address book, email application, word processor and others. Each application can have a set of parameters associated with it. Upon initial activation of the device, values for these parameters may need to be set in order to effectively use the applications. Each application typically has its own set-up interface to provide values for its parameters. However, accessing each set-up interface for each application is often cumbersome and confusing, especially upon initial activation of the device. Further, some applications may share a parameter.

It is desirable to provide an improved system and method for setting parameters for applications on electronic devices.

BRIEF DESCRIPTION OF THE DRAWINGS

The invention will now be described, by way of example only, with references to the accompanying drawings, in which.

DETAILED DESCRIPTION

Figure 1:
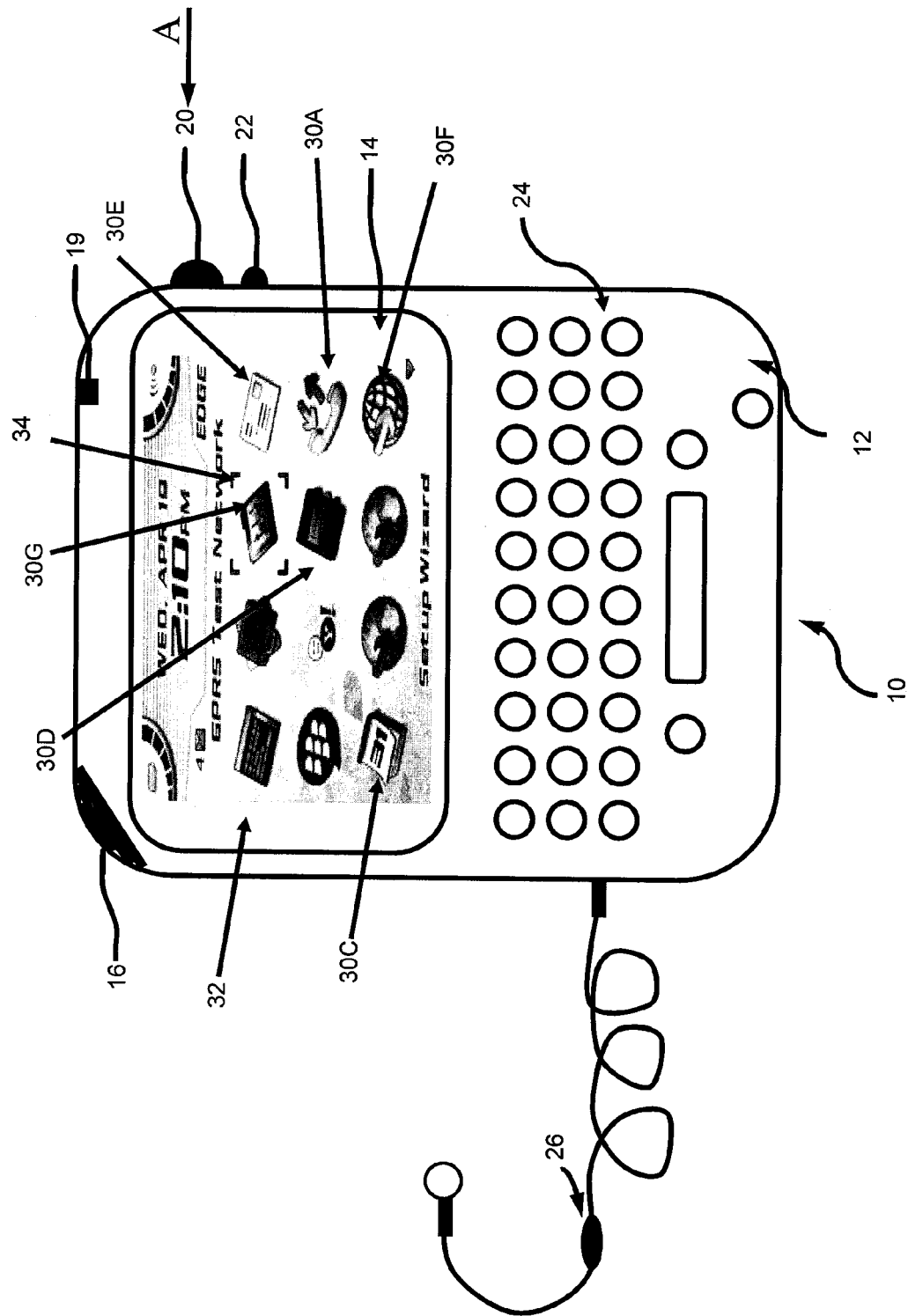
FIG. 1 is a schematic diagram of an electronic device providing a parameter adjustment module (PAM) showing a Graphical User Interface (GUI) that is used to provide access to the PAM per an embodiment.

The description which follows, and the embodiments described therein, are provided by way of illustration of an example, or examples of particular embodiments of features of the present invention. These examples are provided for the purpose of explanation, and not limitation. In the description which follows, like parts are marked throughout the specification and the drawings with the same respective reference numerals.

Generally, an embodiment provides a system and method for setting values for parameters for one or more applications operating on or system settings for an electronic device. Typically, although not necessarily, the device is a mobile, wireless communication device. Also, typically, but not necessarily, the applications are preferably stored locally on the device; in other embodiments, such resources may be accessed remotely from a server. The parameter may be any input, output and/or configuration setting used by an application or system setting. The embodiment facilitates access to and changing of such parameters through a common interface. It will be appreciated that the scope of parameters that may be managed and modified can depend on the applications installed on device 10. Generally, parameters can relate to: an output characteristic or format, including display characteristics (e.g. font types, size of font, etc.), audible or visual characteristics (e.g. loudness of ring tone, type of ring tone, flashing signals, etc.); triggering events for outputs; input formats (e.g. currency formats); location parameters (time, day, location etc.); communication protocols and setting; and others. For the sake of convenience, and not limitation, the term "application" is used to refer herein to any software or firmware application operating on device 10 (whether installed locally or not), any low-level system function operating on device 10, including any operating system functions, any system functions and any other function, whether implemented in hardware, software, firmware or a combination of any of those elements, operating on device 10 that requires a setting of a parameter.

In a first aspect of an embodiment, a method of modifying a parameter for at least one application operating on an electronic device is provided. The method comprises the steps of: upon activation of the device, determining a state of initial configuration for the device; if the state indicates that the device requires configuration, providing a GUI interface allowing for changes to be made to the parameter; and if a change is made to the parameter through the interface, updating a storage location with the change.

The method may further comprise: once the GUI interface is provided on the device on a first instance, subsequently providing the GUI interface only upon a request; and changing the state of initial configuration of the device.

In the method, for the step of providing a GUI interface, depending on the state of initial configuration, the GUI interface may selectively provide a series of GUI screens providing introductory information relating to the device. Further, the introductory information may relate to operational parameters of the device and a network in communication with the device.

In the method, the parameter may be accessed by at least another application for its operation and the other application operates on the device.

In the method, the parameter may relate to a display characteristic for elements generated on a display of the device.

In the method, the device may have CDMA communication capabilities; and aspects of the GUI interface may be accessed only if a telephone number has been programmed into the device.

In the method, the GUI interface may utilize at least one template providing text to be displayed in a GUI screen and options relating to the parameter.

In the method, the device may have communication capabilities with a network; and time zone information relating to the location of the device may be provided from the network; and the time zone information may be used to update an aspect relating to the parameter.

In the method, the time zone information may be derived using triangulation of signals received from the network by the device. Alternatively, the time zone information may be derived using country code information associated with the device provided from the network.

In a second aspect, an electronic device is provided, comprising: at least one software application operating on the device, the application having a parameter relating to its operation; memory; and a module for modifying the parameter for the application. The module operates on the device and the module modifies the parameter by: upon activation of the device, determining a state of initial configuration of the device; if the state of initial configuration indicates that the device requires configuration, providing a GUI interface allowing for changes to be made to the parameter; and if a change is made to the parameter through the interface, updating a record for the parameter. In the device, the memory is used to store the state of initial configuration and the record for the parameter.

In the device, depending on the state of initial configuration, the module may control the GUI interface to selectively provide a series of GUI screens providing introductory information relating to the device.

In the device, the parameter may relate to a display characteristic for elements generated on a display of the device.

The device may have CDMA communication capabilities. Further, aspects of the GUI interface may be accessed only if a telephone number has been programmed into the device.

In the device, the GUI interface may utilize at least one template providing text to be displayed in a GUI screen and options relating to the parameter.

The device may have communication capabilities with a network. Further, time zone information relating to the location of the device may be provided from the network; and the time zone information may be used to update an aspect relating to the parameter.

In a third aspect, a method of providing time information to a portable communication device is provided. The method comprises the steps of: upon activation of the device, determining a state of configuration for the device; if the state of configuration indicates that the device requires configuration of an internally stored time value, deriving time zone information from location information relating to the device provided from a network communicating with the device; and updating a parameter relating to an application that utilizes the time information.

In the method, the time zone information may be derived using triangulation of signals received from the network by the device. Alternatively, the time zone information may be derived using country code data associated with the device. Therein, the method may further comprise comparing the country code data to a preset time zone record provided with the device to determine a current time zone for the device.

In other aspects of other embodiments various combinations of the above noted sets and subsets of aspects can be provided.

First, a description is provided relating to a device that provides a PAM (parameter adjustment module) for applications operating thereon, according to an embodiment. Referring to FIG. 1, an electronic device for receiving electronic communications, in accordance with an embodiment of the invention is indicated generally at 10. Therein, electronic device 10 is based on a computing platform having functionality of an enhanced personal digital assistant with cellphone, web browsing and e-mail features. Such functionalities are provided through software and firmware modules operating on device 10. It is, however, to be understood that electronic device 10 can be based on construction, design and functions of other electronic devices, such as smart telephones, desktop computers pagers or laptops having telephony equipment. Device 10 includes, a housing 12, which frames an LCD display 14, a speaker 16, an LED indicator 19, a trackwheel 20, an exit/escape key 22, keypad 24 and a microphone 26. Trackwheel 20 and escape (exit) key 22 can be inwardly depressed along the path of arrow "A" as a means to provide additional user-input. Keypad 24 is shown as a matrix of three rows of keys with each row having ten keys. In other embodiments a directional key can be provided (not shown), where it is a "rocker"-type key that has a center rest position and can be tilted or moved from its rest position in one of several directions (e.g. up, down, left or right, when viewing the front of device 10) to activate a programmed function associated with the direction of activation. A joystick or a rollerball input device may also be provided instead or in addition to a directional key. Other arrangements of input/output devices (including the number, configuration and layout keys, display, speakers etc.) may be used.

Various applications are provided on device 10, including email, telephone, calendar, address book and help applications. A GUI is provided to provide access to activate these applications on display 14 through a series of icons 30. Main screen 32 is generated as a GUI on device 10, as the "home" GUI that provides the main interface to the main applications and functions operating on device 10. Some of the shown icons include telephone icon 30A, calendar icon 30C, address book icon 30D, email icon 30E, web browser icon 30F and PAM 30G. Selection and activation of an icon 30 will cause activation of its associated software application or module. Each application can be selected and activated using keypad 24 and/or trackwheel 20 to navigate through icons 30 and individually highlight same. Cursor 34 provides a visual cue for each icon as it indicates what icon 30 is currently being "highlighted" as the icons are being navigated. At the bottom of display 14, a corresponding text message may be generated to provide additional information relating to the currently highlighted icon 30. For example, when PAM icon 30G is highlighted, the text "set-up wizard" is presented at the bottom of display 14, as colloquially, the PAM may be referred to as a "set-up wizard".

GUIs operating on device 10 can provide a series of cascading menu bars, drop down menus and selections in one or more screens as the user navigates through the GUI. For example, an application may generate a GUI menu bar at the top of display 14 containing a series of selections therein. Additional "pull down" menus may be generated when a selection is activated or highlighted. A user can navigate through bar and menu selections using a combination of input devices such as wheel 20, escape key 22 and keypad 24. A GUI may show "Back", "Forward", and "Exit" screen navigation buttons, which allow the user to traverse through a linked series of screens, according to the navigation buttons activated. Other GUI implementations may include "radio" buttons, selection lists and pop-up-menus that appear when the user clicks a specific key (such as trackwheel 20) and disappear when the user presses another key (such as escape key 22). The interface for controlling navigation through the GUI using signals generated by the input devices is provided by software and firmware modules operating on device 10. Such modules are known to those skilled in the art.

Figure 2:
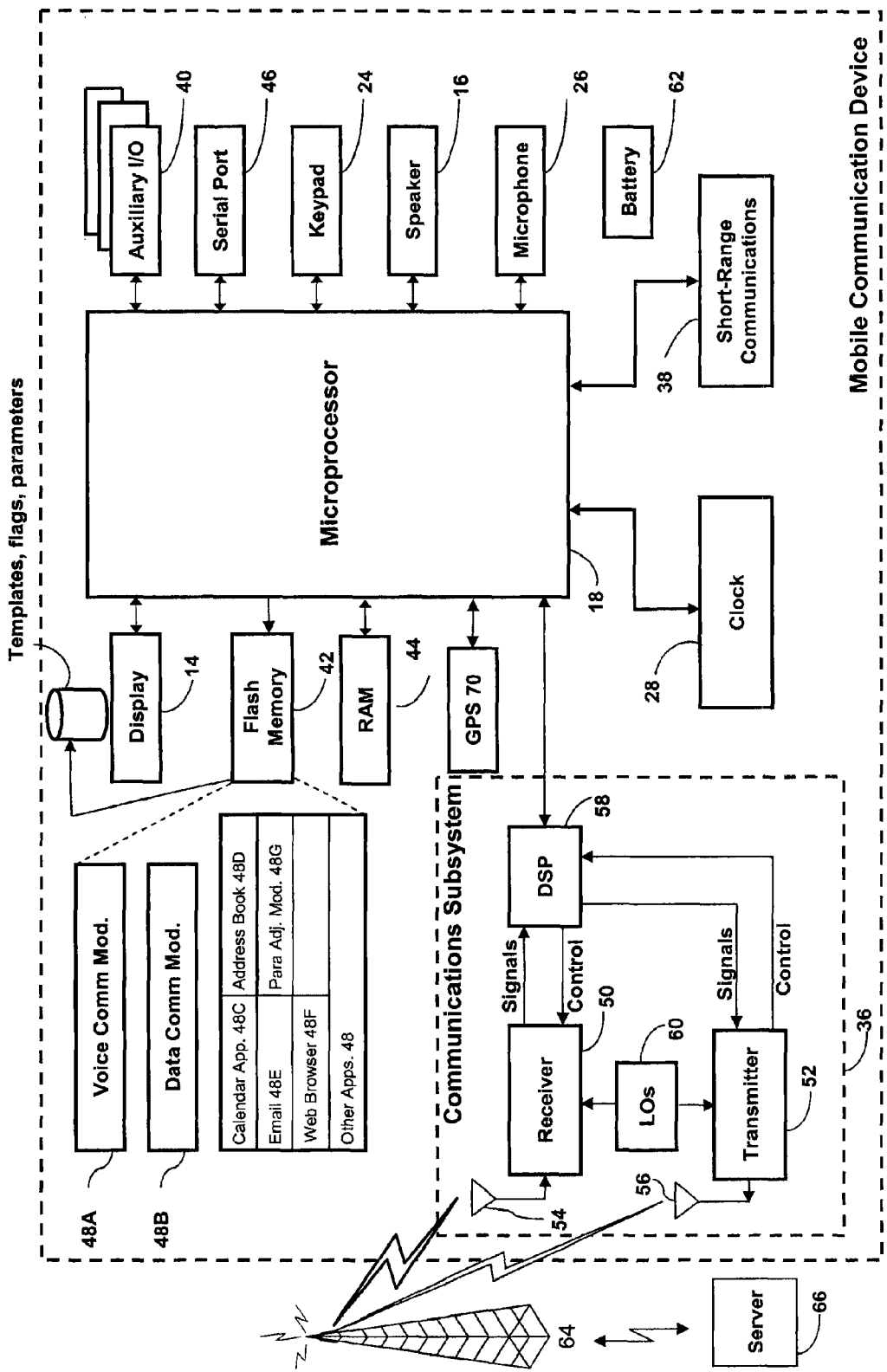
FIG. 2 is a block diagram of internal components of the device of FIG. 1.

Referring to FIG. 2, functional elements of device 10 are provided. The functional elements are generally electronic or electro-mechanical devices. In particular, microprocessor 18 is provided to control and receive almost all data, transmissions, inputs and outputs related to device 10. Microprocessor 18 is shown schematically as coupled to keypad 24, display 14 and other internal devices. Microprocessor 18 controls the operation of the display 14, as well as the overall operation of the device 10, in response to actuation of keys on the keypad 24 by a user. Exemplary microprocessors for microprocessor 18 include Data 950 (trade-mark) series microprocessors and the 6200 series microprocessors, all available from Intel Corporation.

In addition to the microprocessor 18, other internal devices of the device 10 include: a communication subsystem 36; a short-range communication subsystem 38; keypad 24; and display 14; other input/output devices including a set of auxiliary I/O devices through port 40, serial port 46, speaker 16 and microphone 26; as well as memory devices including a flash memory 42 (which provides persistent storage of data) and random access memory (RAM) 44; clock 28, global positioning system (GPS) unit 70 and other device subsystems (not shown). The device 10 is preferably a two-way radio frequency (RF) communication device having voice and data communication capabilities. In addition, device 10 preferably has the capability to communicate with other computer systems via the Internet.

Operating system software executed by microprocessor 18 is preferably stored in a computer-readable medium, such as flash memory 42, but may be stored in other types of memory devices, such as read only memory (ROM) or similar storage element. In addition, system software, specific device applications, or parts thereof, may be temporarily loaded into a volatile storage medium, such as RAM 44. Communication signals received by the mobile device may also be stored to RAM 44.

Microprocessor 18, in addition to its operating system functions, enables execution of software applications on device 10. A set of software applications 48 that control basic device operations, such as voice communication module 48A and data communication module 48B, may be installed on the device 10 during manufacture or downloaded thereafter.

Communication functions, including data and voice communications, are performed through the communication subsystem 36 and the short-range communication subsystem 36. Collectively, subsystem 36 and subsystem 38 provide the signal-level interface for all communication technologies processed by device 10. Various other applications 48 provide the operational controls to further process and log the communications. Communication subsystem 36 includes receiver 50, transmitter 52 and one or more antennas, illustrated as receive antenna 54 and transmit antenna 56 to communicate with remote network 64. In addition, communication subsystem 36 also includes processing module, such as digital signal processor (DSP) 58 and local oscillators (LOs) 60. The specific design and implementation of communication subsystem 36 is dependent upon the communication network in which device 10 is intended to operate. For example, communication subsystem 36 of the device 10 may be designed to operate with the Mobitex (trade-mark), DataTAC (trade-mark) or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Communication subsystem 36 provides device 10 with the capability of communicating with other devices using various communication technologies, including instant messaging (IM) systems, text messaging (TM) systems and short message service (SMS) systems.

In addition to processing communication signals, DSP 58 provides control of receiver 50 and transmitter 52. For example, gains applied to communication signals in receiver 50 and transmitter 52 may be adaptively controlled through automatic gain control algorithms implemented in DSP 58.

In a data communication mode a received signal, such as a text message or web page download, is processed by the communication subsystem 36 and is provided as an input to microprocessor 18. The received signal is then further processed by microprocessor 18 which can then generate an output to the display 14 or to an auxiliary I/O port 40. A user may also compose data items, such as e-mail messages, using keypad 24, a trackwheel associated with keypad 24, and/or some other auxiliary I/O device connected to port 40, such as a touchpad, a rocker key, a separate trackwheel or some other input device. The composed data items may then be transmitted over communication network 64 via communication subsystem 36.

In a voice communication mode, overall operation of device 10 is substantially similar to the data communication mode, except that received signals are output to speaker 16, and signals for transmission are generated by microphone 26. Alternative voice or audio I/O subsystems, such as a voice message recording subsystem, may also be implemented on device 10.

Short-range communication subsystem 38 enables communication between device 10 and other proximate systems or devices, which need not necessarily be similar devices. For example, the short-range communication subsystem may include an infrared device and associated circuits and components, or a Bluetooth (trade-mark) communication module to provide for communication with similarly-enabled systems and devices. A Wi-Fi connection may also be provided.

Powering the entire electronics of the mobile handheld communication device is power source 62. Preferably, the power source 62 includes one or more batteries. More preferably, the power source 62 is a single battery pack, especially a rechargeable battery pack. A power switch (not shown) provides an "on/off" switch for device 10. Upon activation of the power switch an application 48 is initiated to turn on device 10. Upon deactivation of the power switch, an application 48 is initiated to turn off device 10. Power to device 10 may also be controlled by other devices and by internal software applications.

Brief descriptions are provided on the applications 48 stored and executed in device 10. Additional applications include calendar 48C which tracks appointments and other status matters relating to the user and device 10. Calendar 48C is activated by activation of calendar icon 30C on display 14. It provides a daily/weekly/month electronic schedule of appointments, meetings and events entered by the user. Calendar 48C tracks time and day data for device 10 using processor 18 and internal clock 28. The schedule contains data relating to the current accessibility of the user. For example it can indicate when the user is busy, not busy, available or not available. In use, calendar 48C generates input screens on device 10 prompting the user to input scheduled events through keypad 24. Alternatively, notification for scheduled events could be received via an encoded signal in a received communication, such as an e-mail, SMS message or voicemail message. Once the data relating to the event is entered, calendar 48C stores processes information relating to the event; generates data relating to the event; and stores the data in memory in device 10.

Address book 48D enables device 10 to store contact information for persons and organizations. Address book 48D is activated by activation of address book icon 30D on display 14. In particular, name, address, telephone numbers, e-mail addresses, cellphone numbers and other contact information is stored. The data can be entered through keypad 24 and is stored in an accessible a database in non-volatile memory, such as persistent storage 42, which is associated with microprocessor 18, or any other electronic storage provided in device 10.

Email application 48E provides modules to allow user of device 10 to generate email messages on device 10 and send them to their addressees. Application 48E also provides a GUI which provides a historical list of emails received, drafted, saved and sent. Text for emails can be entered through keypad 24. Email application 48E is initiated by activation of email icon 30E presented on display 14.

Browser application 48F is an application that can access information from the Internet (such as HTML or active documents) or an intranet, as well as folders in the local file system and on a network and generate results on display 14. Such applications are known in the art. If a link (as an address) to a web site is provided by another application to browser 48F, it will search the Internet or intranet (as relevant) for the web site associated with the link.

Figure 3:
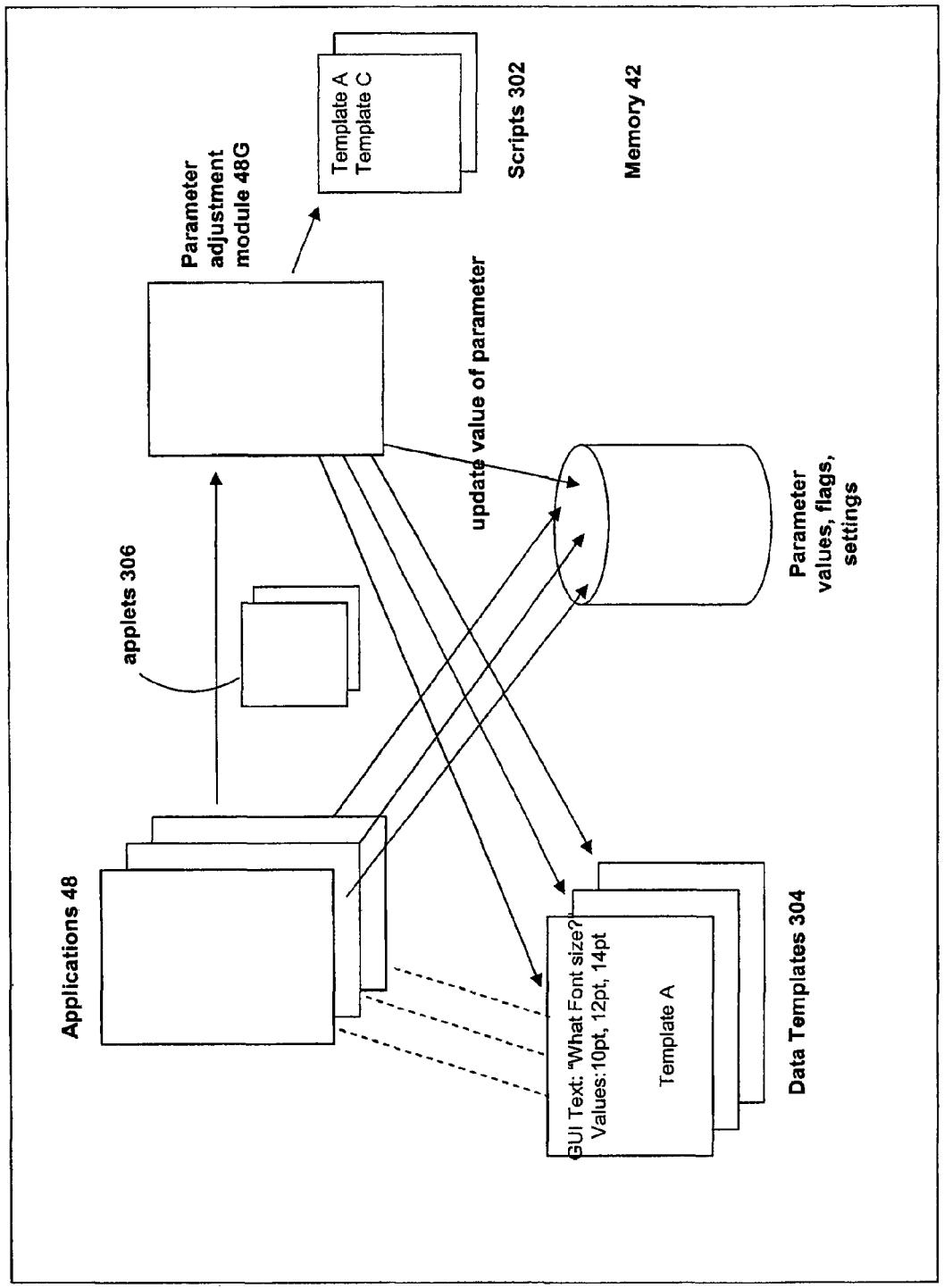
FIG. 3 is a block diagram of software and data elements operating in the device of FIG. 1 relating to the PAM.

Referring to FIGS. 1 and 3, further detail is provided on how an embodiment utilizes, maintains and updates any of the parameters associated with an application operating on device 10 or an operating parameter provided by network 64 to device 10.

Specifically, an embodiment implements a PAM which provides a series of GUI interfaces that are generated on the display 14 of device 10 on a "newly" provisioned or upgraded device 10. Preferably, the PAM provides a centralized set-up scheme for a set of basic set-up parameters to allow the user to easily define basic parameters for certain applications and system configurations of device 10.

In an embodiment, PAM 48G is a separate application operating on device 10. It has a library of GUI screens and to solicit and process inputs from a user for values for various parameters, including font types and size, time, day and location, and any other parameters that may be used by one or more applications or system functions on device 10. Parameter values provided to PAM 48G are then provided to update specific option variables for any related application(s) or function(s). As such, applications and functions can utilize those values for those parameters during their operation.

In PAM 48G, each GUI screen can be deployed to have GUI navigation and interface capabilities per earlier-noted GUI navigation systems. The GUIs may be grouped into categories that are selectively presented to the user depending on a particular context (e.g. has the device been configured partially already, is some configuration component not yet completed, etc.) One set of GUIs may include a set of screen tutorials that provide information on user interface basics; another set may provide a tool to adjust basic operations options on an application or for the device itself.

Referring to FIG. 3, PAM 48G provides a framework for presenting a series of GUIs to a user using device 10; manages navigation through each GUI in the series as a user provides input to, or navigates through, the present GUI screen; tracks where the progression through the series, depending on the inputs provided by the user; and extracts, assesses and stores any values of any parameters provided by a user navigating through a particular GUI screen.

PAM 48G has a series of scripts 302 that are preferably stored in memory 42. A script tracks a series of GUI and has flags to track the current status of the script (e.g. initiated, partially completed, fully completed) and the current state of device 10 (e.g. initially activated, telephone code set, reset recently etc.). A set of scripts may be provided, for example, to where different scripts provide different templates for different devices 10 (e.g. CDMA device, stand alone device, PDA only etc.). In one embodiment the PAM is used during initial configuration of device 10. A flag representing the state of the initial configuration of device 10 may be maintained and accessed to determined whether to activate the PAM and if so, at which input GUI in the GUI series.

A script may have a set of GUIs encoded therein. Each GUI can provide a preset set of parameter options to the user. Once a particular parameter is set, PAM 48G updates the value to a centrally accessible memory location, preferably in device 10 and in memory 42, such that any application that utilizes that parameter, can have a predetermined function or call to access that memory location to retrieve and utilize the value of that parameter as required.

In another configuration, a script may utilize a series of templates 304 stored in memory 42 (or elsewhere) to provide the particular text, selection, navigation and update information for a particular parameter. A template can provide all the text and images for a GUI screen. It can also provide the memory location for the parameter that can be updated as well as any limitations thereon.

For example, for a given set of relevant applications, a template can be defined and set to provide the GUI interface for a particular parameter (e.g. font size). The template can update a pre-set known memory location in memory 42 with the value of the font size. Then, any application that requires information relating to the font size for its text (e.g. email 48E or calendar 48C) can access that value and use the value accordingly within its application.

Figure 10:
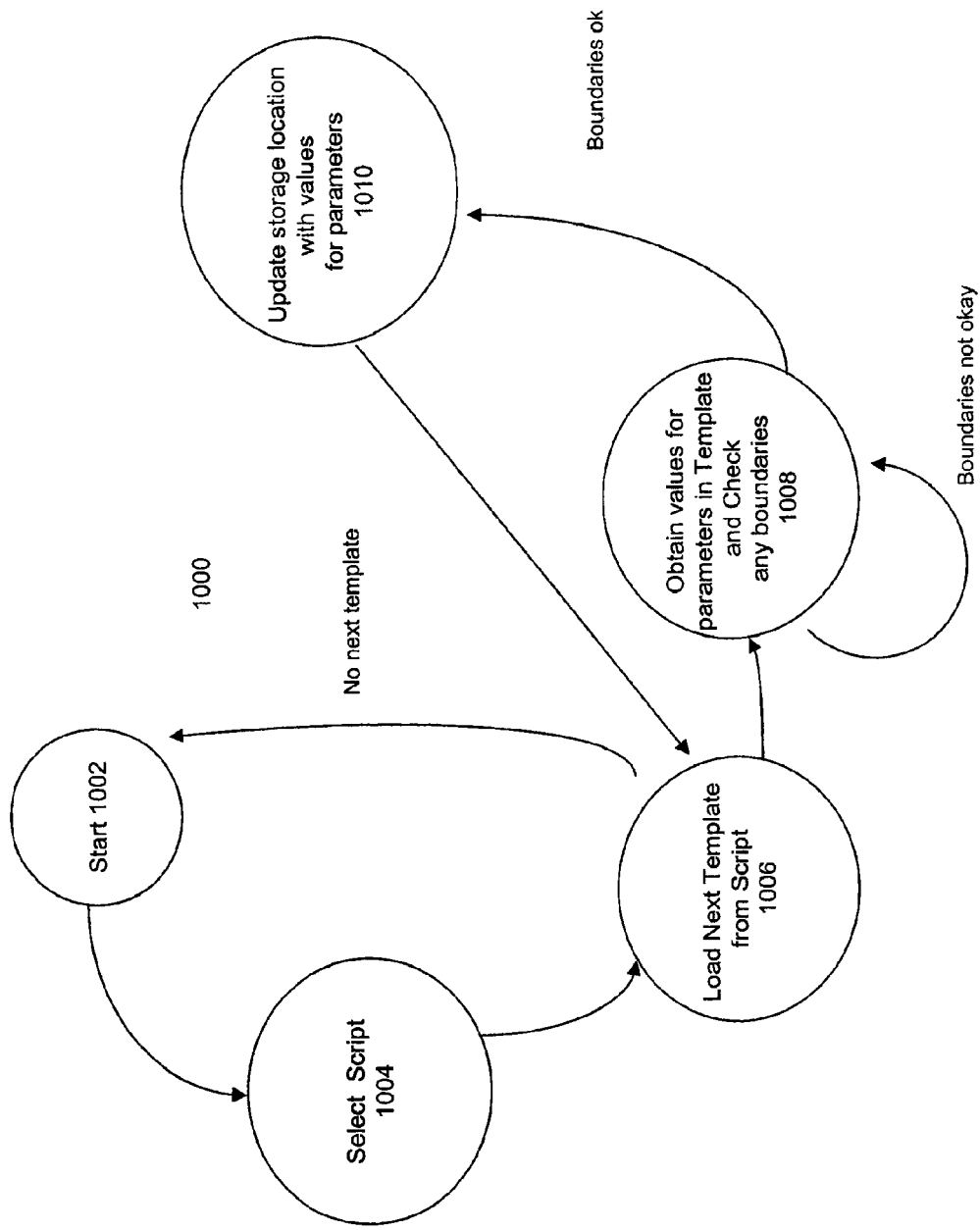
FIG. 10 is a flow chart of exemplary steps conducted by the PAM for the device of FIG. 1.

Referring to FIG. 10, an exemplary process for PAM 48G is shown at 1000 as a state diagram. First, at step 1002, PAM is activated (typically by user of device 10 or upon initial activation of device 10). At step 1004, a script 602 may be selected. Thereafter, at step 1006, the script is initiated and its first template 604 defined therein is retrieved. The GUI for the template 604 is populated and generated on display 14. Thereafter, device 10 waits for an input for a value for a parameter from the user. Once an input is provided, at step 1008, the input is accepted and tested for compliance to any boundary limitations. If the boundary conditions are met, at step 1010, the value for parameter is updated in the predefined storage location associated with that parameter; and then, the process returns to step 1008 for the next template. However, from step 1008, if the boundary conditions are not met, then the process may provide an error indication and wait for a subsequent input. In a version of the process, it can be exited by the user (i.e. from state 1008) at any time, depending upon a predetermined input from the user (e.g. activation of the ESC key 22).

The operational interface between PAM 48G, its script 302 and the templates 304 can be controlled by an applet 306. In one embodiment, an applet (or executing program—i.e. thread) may be provided to control all the settings on one page of PAM 48G and it may be also tasked with generating the initial template. For each GUI screen and for its noted parameter, the applet can manage the flow and processing of data between the templates and PAM 48G. The responses are received through the GUI, then the applet extracts the provided data and updates all settings (preferably stored in device 10) as are associated with the parameters. In one embodiment, the definition of the parameters and the applet are preset, such that when the GUI is activated for a particular parameter, the applet is predefined and has been preloaded with any scripts for the GUI and its options. Once the screen entry is completed, it provides an update to the relevant datasets for the related application. As such, there can be many applets for many parameters. It will be appreciated that other structures and interfaces can be provided for PAM 48G to allow it to update the parameters.

PAM 48G can be selectively initiated on device 10. One convenient time to have PAM 48G activated is upon initial activation of device 10. Once the parameters therein have been set (either fully or partially) to the satisfaction of the user of device 10, PAM 48G may be accessed less frequently, if at all. However, if device 10 is reset or is upgraded, then if all previous default parameters have been reset, then it may be beneficial to automatically activate PAM 48G again and have it present all default information to the user. As such, the activation of PAM 48G may be set to be activated automatically upon the first activation (or re-activation) of device 10. Also, if the device is reset prior to completion of PAM 48G, then a (non)completion flag may be set and the user may be prompted to run the PAM 48G again at a particular time. Alternatively or after PAM has been activated on a first instance, PAM 48G may be accessed by activating the appropriate icon 30G on screen 32. An internal set of flags accessed by PAM 48G or a routine that controls the initiation of PAM 48G may track the particular state of device 10 and the operation history of PAM 48G. Based on the values of those item (with possibly other values of other items), PAM 48G may or may not be activated. PAM 48G may be automatically activated, activated only upon specific initiation by the user; activated beginning at a specific point in its operation; or not activated at all.

When device 10 is activated and the main GUI screen 32 (referred to occasionally as a "ribbon") first appears, PAM 48G automatically executes and produces a dialog GUI. The dialog provides a set of execution options to the user, including start execution, defer execution for 24 hours, or to dismiss it permanently. If the user presses escape key 22 on device 10, then PAM 48G is dismissed permanently.

When PAM 48G is first launched from the ribbon, the user is preferably guided through the setup screens without a table of contents being displayed. If PAM 48G is launched from the ribbon or the main menu screen, then the user is presented with a list of the titles of all the setup screens that comprise PAM, arranged in sequence. The user can scroll to any title and click on it to enter the related screen directly. When the user enters a screen directly upon activating "Next", the next screen in the sequence is displayed (the user can continue the sequence at the starting point of his choosing). Applications can register with PAM 48G to provide additional setup items at specified positions. As such, PAM has flexibilities to extend its controllable parameters in the future. Preferably, any screen may be accessed directly from the table of contents.

When the user re-executes PAM 48G, one implementation of PAM 48G re-enters the stream of screens at the last screen displayed when PAM 48G was previously terminated. If the stream of screens in PAM 48G was fully completed at its last execution, then first screen is displayed.

As noted earlier, PAM 48G may have different settings and run different GUI scripts for different devices. For example, PAM 48G operating on a CDMA device may require that the related phone number for device 10 is programmed into device 10 prior to operation of PAM 48G. The status of a flag may be kept to indicate whether the number has been programmed. Any parameter requiring the existence of the phone number may selectively check the status of the flag and either present a parameter for modification (if the flag indicates that the phone number has been set) or provide a message indicating that the phone number needs to be set to continue (if the flag indicates that the number has not been set). Thereafter, certain sets, subsets or other aspects of the screens generated by PAM 48G may be provided on device 10, depending on whether or not the phone number has been provided. For different devices, different scripts 302 may be used.

Further detail is now provided on exemplary parameters for device 10 that can be controlled using PAM 48G by providing and describing exemplary screens generated by PAM 48G using exemplary templates. As noted earlier, once a value for a parameter is provided, the value is updated in the corresponding central memory location in memory 42 that is known to all relevant applications, such that the applications can access the parameter and use the value accordingly in their operation. Alternatively, the values may be stored remote to device 10, and the values would be remotely retrieved by the applications, as needed.

Figure 4:
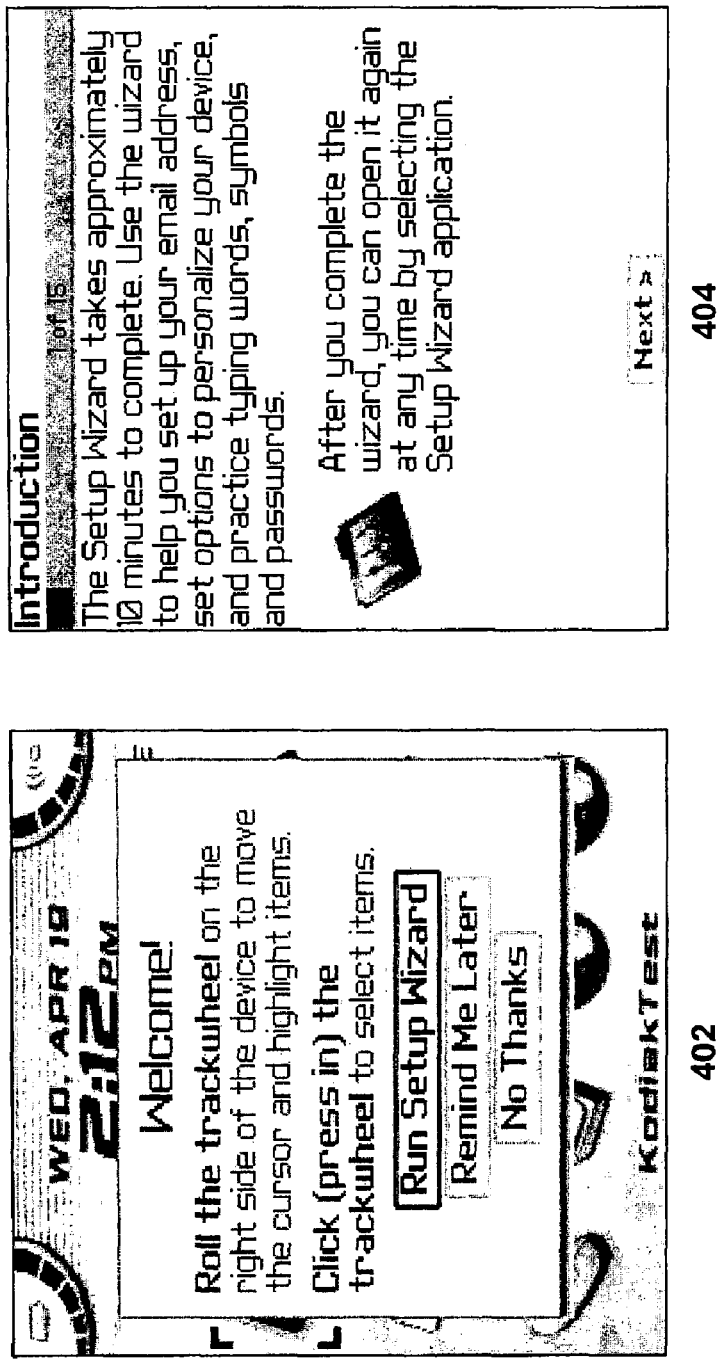
FIG. 4 is a snapshot of two exemplary introductory GUIs generated on the display of the device of FIG. 1 after initial activation of the PAM.

Referring to FIG. 4, two GUIs 402 and 404 are shown. These GUIs provide the introduction screens to a "first time" user, which may be provided to a user upon initial activation of device 10. The introduction screen may include any information, including device navigation information, device set-up information, network information, and any other information that should be provided to the user once (preferably at startup). The activation status of device 10 may be determined or reflected by a commonly accessible flag stored in memory 42. For a device 10 that has just been activated for the first time, there are advantages to presenting the user with the option(s) of setting one or more commonly used parameters through PAM 48G. These screens may be provided as a set of templates 304 in a script 302.

As such, screen 402 provides an initial introduction to initial configuration options provided through PAM 48G (for its current script). The shown dialog choices include: start PAM 48G now ("run"), start later ("remind me later"), do not start ("no thanks"). The user would navigate through these choices using the input keys on device 10. If a selection is made to start now, then basic tutorial made be provided, for which the first screen therein is shown as screen 404. A progress tracker at the top of screen 404 shows how many screens have been viewed. An internal flag tracks the progress, to allow PAM 48G to begin at a particular screen if a particular session has not been completed.

Figure 5:
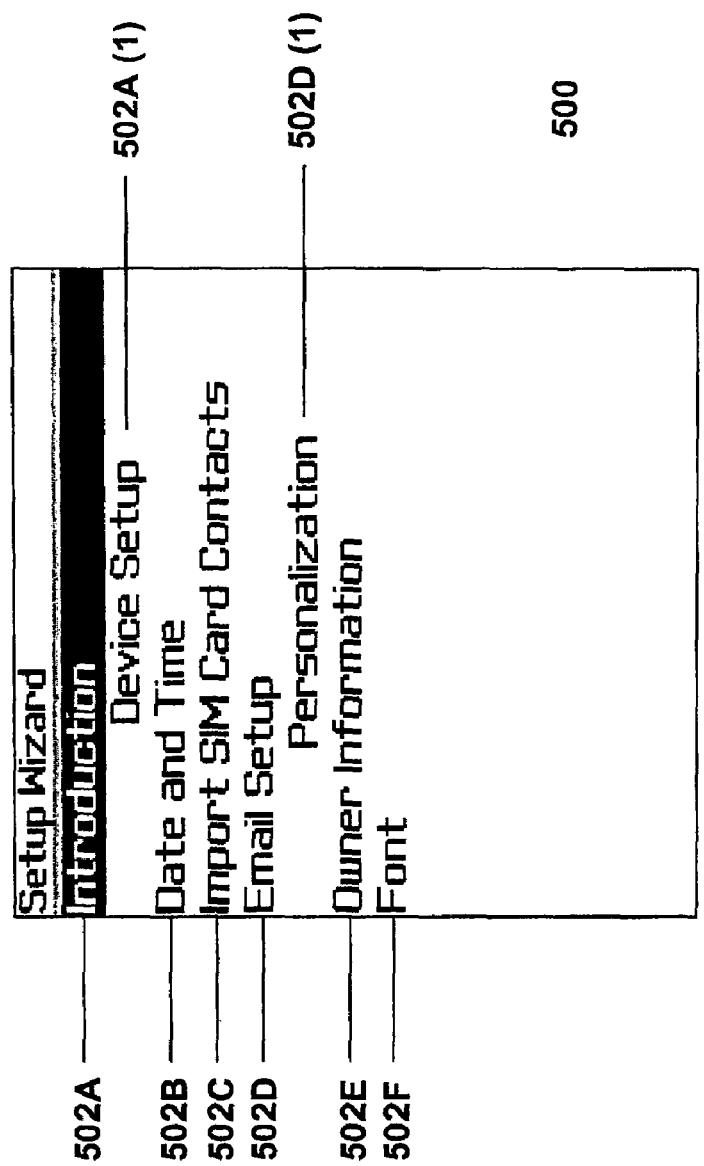
FIG. 5 is a snapshot of an exemplary index GUI generated on the display of the device of FIG. 1 during operation of the PAM.

Referring to FIG. 5, screen 500 shows categories of parameters 502 that can be accessed for the particular device 10. Categories include: Introduction 502A, showing basic navigation concepts and subcategory 502A(1) for particular (low-level) device set-up parameters; date and time 502B settings allowing the local time values to be set; SIM contact 502C; Email setup 502D, including alert levels, auto responses, in personalization subcategory 502D(1); owner information 502E; and default fonts 502F. Other categories can be provided. Less categories can be provided.

Figure 6:
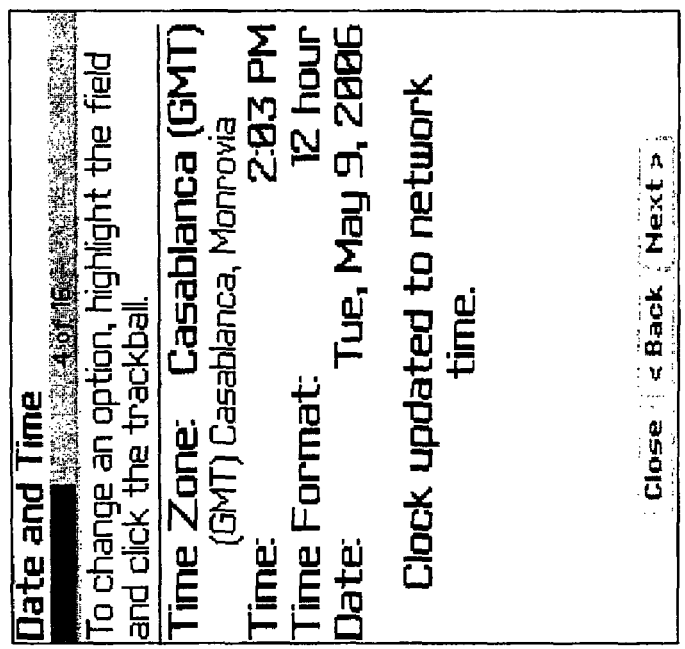
FIG. 6 is a snapshot of an exemplary GUI to set date and time parameters for the device of FIG. 1 generated during a session to set local time settings for the device using the PAM.

Referring to FIG. 6, date and time particulars are shown in GUI screen 600. It will be seen that time and date particulars can be manually provided by the user, as well as time zone information. As such all time co-ordinates for relevant applications (e.g. calendar application 48C, email application 48E and others) can be aligned to parameters provided from this screen. As an additional feature, an embodiment may obtain time zone and/or time and date information from other sources (e.g. from server 66, FIG. 2) automatically without prompting from the user. As such, these automatically obtained values may be pre-populated into screen 600 and screen 600 (and its underlying template) may be set-up to prompt the user to validate the values provided. Further detail on exemplary systems and techniques in an embodiment that automatically provide time, date and/or time zone information for device 10 is provided later.

Figure 7:
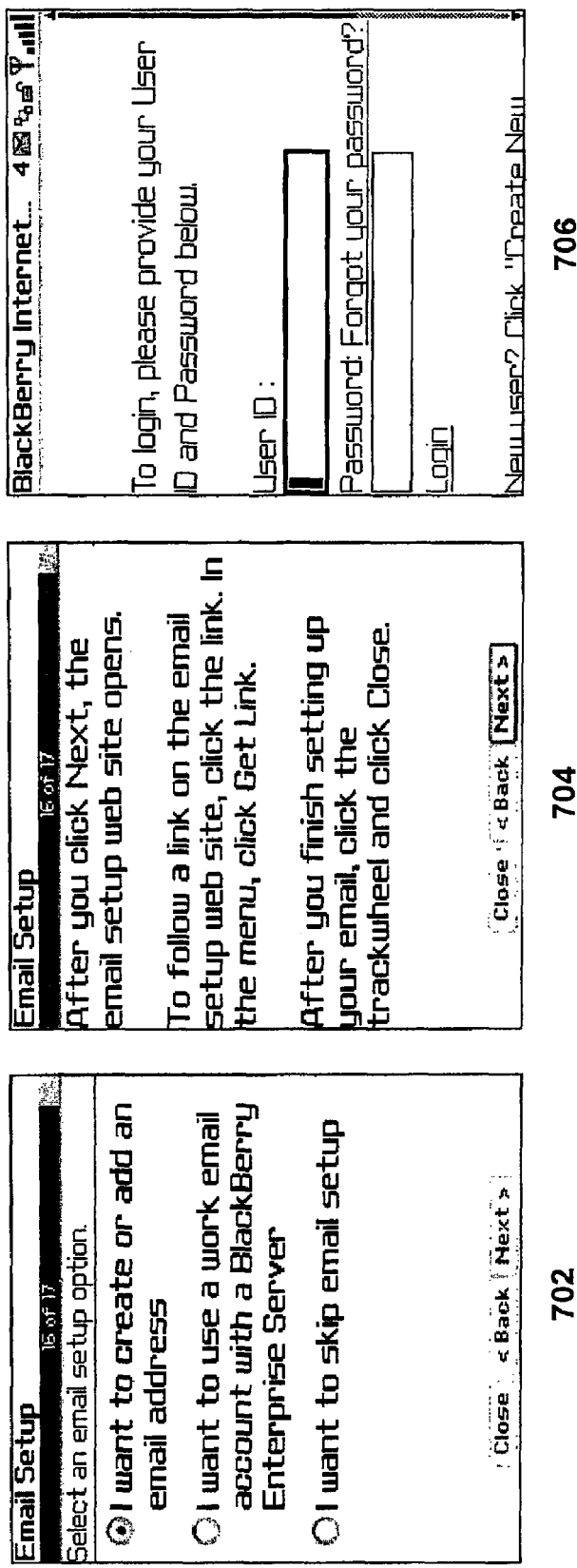
FIG. 7 is a snapshot of three exemplary GUIs sequentially generated during an exemplary session to set communication parameters for applications during operation of the PAM.

Referring to FIG. 7, three GUI screens 702, 704 and 706 are shown relating to the category of email parameters 502D(1) (FIG. 5). GUI screen 700 is the first screen providing the user with a first choice as to what type of email set-up is desired. Screen 704 is a general information screen on the email parameters and screen 706 is the first authentication screen for the user that is required to authenticate then set the email parameters for the user of device 10.

Figure 8:
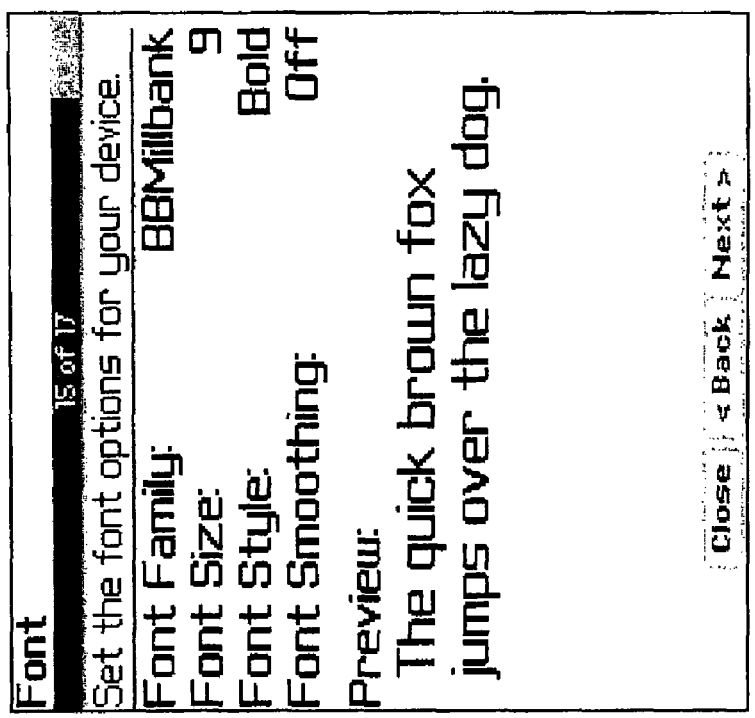
FIG. 8 is a snapshot of an exemplary GUI generated during a session to set the font and display parameters for applications during operation of the PAM.

FIG. 8 is GUI screen 800 showing a set of font parameters that can be set. Parameters include font type; font size, style and whether text smoothing is to be provided on the generated text.

Figure 9:
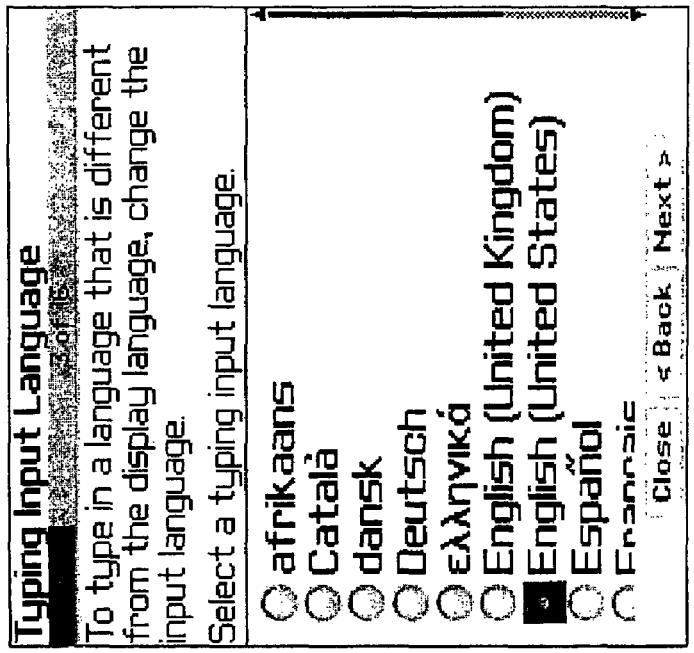
FIG. 9 is a snapshot of an exemplary GUI generated during a session to set language parameters for applications during operation of the PAM.
Figure 9:
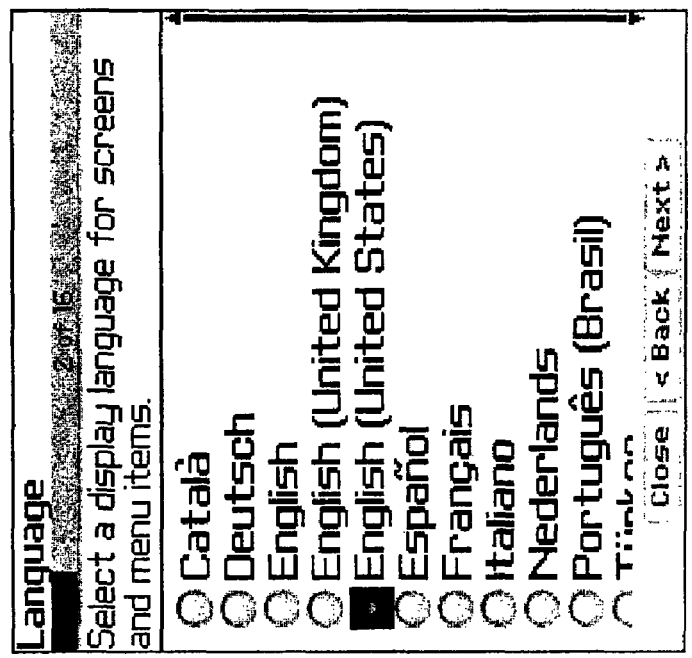

FIG. 9 shows GUI screens 902 and 904 that provide snapshots of screens for language selections for device 10 through PAM 48G. A list of languages available on device 10 can be provided through a template 304 (FIG. 3). A set of radio buttons allows selections to be made. Once the language has been selected, if an application has different language text capabilities, it can use the value of the language parameter to adjust its text generated on display 14.

Further detail is now provided aspects of device 10 when it has wireless communication capabilities relating to an embodiment. In particular, having such communication capabilities allows device 10 to obtain data on parameters from the network that is presently communicating with device 10. These parameters can be provided by network 64, but may also be changed by a user through PAM 48G.

First, when device 10 enters the communication zone of network 64 or when device 10 is initially activated within network 64, device 10 needs to establish communications with the network. When establishing initial (or updated) contact with device 10, network 64 can establish and maintain certain handshaking, registration and configuration parameters for device 10.

In network 64, server 66 provides device 10 with access to remote resources, including files, data or a combination of other resources. Resource management software operating on server 66 allows the resource to be updated and information about resource to be extracted and distributed to device 10. This may include a remotely-operated PAM for a device. Any trigger may initiate the data transmission, including a change in resource, a change in the network 64 or detection of any new devices to network 64. It will be appreciated that devices 10 may be notified of changes or new resources by other communication methods. For example, in another embodiment, management software may generate and send an email message to device 10 containing a notification of the new content and access link for resource. Alternatively, a specific background transmission may be sent to device 10 that is received and processed by device 10 without any interaction by its user. Other commands and messages may be provided.

Server 66 may include any of a series of servers including a registration server, a corporate mobile data service (MDS) server, a public MDS server, a generic provisioning server, a wireless application protocol (WAP) server. Each server can manage different resources. Each server may be positioned at different access points within the network 64 for device 10 (e.g. behind firewalls, incorporated with local corporate servers, incorporated with specific carriers for wireless/wired services, incorporated with a generic services for multiple carriers, etc.). As such, different servers can provide different levels of security, access and speed of access when providing resources to devices 10. Each server may also have different protocols for providing their updated service records to device 10. Each server may provide resources relating to applications, accounts, access information, carrier information (if applicable), devices, or other information that it can store, process or extract from any of its related systems and software.

Further detail is provided on activating a brand new, never activated device 10. Prior to deployment of device 10 to its user, the carrier associated with network 64 that is initially associated with device 10, the carrier can install and set initial values to flags and parameters for device 10. When device 10 is first activated by the user, the first initialization step is to enable the communication system of device 10. The communication system detects the presence of at least one network 64 and uses the address of the registration server stored in device 10 by the carrier to send a registration request to the registration server. The registration server, in conjunction with a provisioning server determines, whether device 10 may be provisioned with a service record. If the service record has been provisioned for the device before, or if the device has been designated not to be provisioned with the associated resource, or if the device has been designated to be provisioned with the associated resource by an alternate method, the registration request is denied. If the registration request is approved, the device is provided with a service record generated by server 66 relating to resource that contains links and text that enable the device 10 to access resource. Additional services may also be provisioned in the record.

A service record delivered to device 10 is compatible with the device's capabilities for displaying and collecting data. The service records may be simply data packets that contain collections of parameters. Some of those parameters may be references to resources that can be associated either with the device or with specific applications on the device. Those parameters may be in the form of content (such as, but not limited to, HTML or WML links) that is compatible with the display capabilities of the device. But those parameters may also be more abstract pieces of data, such as just an URL and descriptive text associated with each external resource (and possibly an identifier to describe which application(s) on the device each particular link applies to). In those cases, the applications themselves may choose to make those resources available to the user in their own way (such as via a menu item in that application, which, if selected, will access the content indicated by the resource) or by dynamically incorporating an access link within textual or graphical content that the application presented to the user. Additionally, any links can be ordered or presented in the application in a manner determined by a pre-set ranking scheme.

Further detail is now provided on automatic setting of a time zone parameter, introduced in FIG. 6. As device 10 is a portable device, it can be seen that a user may take device 10 on trips and cross time zones. As such when a user arrives in a new time zone, the original settings made through PAM 48G may not be locally accurate. One option to correct the time zone setting is to manually activate PAM 48G then re-access GUI 600 (FIG. 6) to set the correct, current time zone. Once the correct time zone value is provided, the time zone parameter can be updated and any application that uses it, can access the updated value to use the correct offset for time of day calculations.

However, an embodiment provides one or more alternative automatic processes and systems to determine the current time and time zone associated with device 10. If device 10 is a wireless communication device, such as a cellular telephone, an embodiment can use ancillary location data to determine what the local time zone is. Some embodiments use location data provided from a local carrier providing the local wireless network 64. Details on exemplary systems and data allowing device 10 to make such a determination are provided below.

A first system to determine the current local time zone for device 10 selects the current time zone based on daylight savings and time zone offset data that is transmitted in data packets from the transmitters of selected wireless carriers. Device 10 stores or has access to a list of time zones and daylight savings data. When device 10 receives a data packet, a process operating on it extracts the time zone offset data, then compares the data against the list of time zones and daylight savings data. Preferably, the process selects the current time zone as being the first time zone that matches with the time offset data provided from the carrier data.

A refinement to the first system may make the selection after accessing additional statistical information, such as comparing the number of subscribers in each time zone having the same offset, then selecting the zone having the most subscribers.

A second system utilizes country code data that is associated with device 10 and correlates it to a preset time zone record. The time zone record may contain data such as a GMT offset amount, and local daylight savings time start and end dates. The time zone records may be stored and maintained centrally for all local servers at a network operations centre (NOC) associated with network 64. The records may be provided to the local servers of the network from the NOC and then the local servers may provide the data to the devices 10. The devices themselves may be shipped with a hard-coded country code in their configuration table stored in their local memory.

One format for country code data that can be used is the International Organization for Standardization (ISO) country codes. To use the ISO country code data with the time zone record for device 10, the local country code associated with the country in which device 10 was initially configured is associated with the time zone record that is provided by the wireless carrier to device 10 through network 66 upon activation of device 10. Typically the ISO country code of the country where a particular device 10 was initially sold by a carrier is stored in an internal configuration table in device 10. When device 10 receives a time zone record, device 10 compares that information against the time zone associated with the country code stored in the internal configuration table. From a match between the time zone record and the time zone associated with the stored country code, time zone information (and 12/24 time format) is derived. As such, this time zone information can be applied to the time zone parameter, for later use by any relevant applications. If a country modifies its time zone or daylight savings time, then an update for the time zone record can be transmitted from server 66, so that time zone settings for device 10 can be automatically updated.

Another system determines a location of device 10 utilizing on signal triangulation techniques from two reference points. The reference points may be provided from signals received from two or more radio towers in network 66. Alternatively, a GPS receiver on device 10 can provide location information. Upon arrival of device 10 into a new network 64, device 10 (or its associated relay) transmits triangulation information to server 66. Thereafter, server 66 utilizes the triangulation information to determine the location of device 10 and then uses the location to determine the correct time zone for device 10. Then, server 66 will send a data packet containing the time zone choice to device 10. When device 10 receives the time zone data, a process applies it to the time zone parameter stored therein. Device 10 may need to poll server 66 periodically for current time zone information.

Yet another system utilizes server 66 to track time zone data for device 10 that communicate with network 64. When a particular device 10 re-registers in network 64, server 66 send a data packet to device 10 with the (last) time zone data that had been associated with that particular device 10. When device 10 receives the time zone data, a process applies it to the time zone parameter stored therein.

Once the time and/or time zone information is provided or derived by device 10, then PAM 48G may use that information to update any aspect of a parameter that is accessed by an application that has a connection to that information.

Other systems may use techniques using information provided from network 64 to determine the location of device 10. A time difference of arrival (TDOA) method measures the time that it takes a signal to travel from device 10 to cell towers in network 64 and then uses triangulation calculations to determine the location of device 10. This method requires three reference stations. Other techniques, known in the art, may also be used.

It will be appreciated that all of the applications, modules, processes, data bases, data processing data transmission and other features and techniques described herein may be implemented in software, firmware and hardware processes and designs using skill of those skilled in the art.

The present invention has been described here by way of example only. Various modification and variations may be made to these exemplary embodiments without departing from the scope of the invention.

We claim:

1. A method of modifying a parameter for at least one application by a set up application operating on an electronic device, comprising the steps of:

upon activation of the device, determining a state of initial configuration for the device from configuration data stored in the device;

if the state of initial configuration indicates that the device requires configuration, initiating the set up application and automatically generating a series of graphical user interface 'GUI' screens on a display of said device, said series of GUI screens providing introductory information relating to the device only on a first activation of the device;

if a change is made to a parameter through the GUI interface, updating a storage location in memory of the device with the change;

changing the state of initial configuration of the device after the set up application is activated on the device to reflect an operation history of the set up application; and if the state of initial configuration indicates that the set up application had previously been initiated, presenting a GUI where said at least one application and said set up application are presented and upon a subsequent activation of the set up application, activating said set up application at a point in its operation based on the operation history.

2. The method of modifying a parameter for at least one application by a set up application operating on an electronic device as claimed in claim 1, wherein the introductory information relates to operational parameters of the device and a network in communication with the device.

3. The method of modifying a parameter for at least one application by a set up application operating on an electronic device as claimed in claim 1, wherein the parameter is accessed by at least two applications for its operation and the at least two applications operate on the device.

4. The method of modifying a parameter for at least one application by a set up application operating on an electronic device as claimed in claim 1, wherein the set up application has access to a table of contents GUI providing topics that are displayed on said subsequent activation of the set up application.

5. The method of modifying a parameter for at least one application by a set up application operating on an electronic device as claimed in claim 3, wherein the parameter relates to a display characteristic for elements generated on a the display.

6. The method of modifying a parameter for at least one application by a set up application operating on an electronic device as claimed in claim 5, wherein the GUI interface utilizes at least one template providing text to be displayed in a GUI screen and options relating to the parameter.

7. The method of modifying a parameter for at least one application by a set up application operating on an electronic device as claimed in claim 6, wherein:
   the device has CDMA communication capabilities with the network; and
   aspects of the GUI interface can be accessed only if a telephone number has been programmed into the device.

8. The method of modifying a parameter for at least one application by a set up application operating on an electronic device as claimed in claim 7, wherein:
   the device has wireless communication capabilities;
   time zone information relating to the location of the device is provided from the network; and
   the set up application uses the time zone information is used to update an aspect relating to the parameter.

9. The method of modifying a parameter for at least one application by a set up application operating on an electronic device as claimed in claim 8, wherein the time zone information is derived using triangulation of signals received from the network by the device.

10. The method of modifying a parameter for at least one application by a set up application operating on an electronic device as claimed in claim 8, wherein the time zone information is derived using country code information associated with the device provided from the network.

11. An electronic device comprising:
   at least one software application operating on the device, the at least one application having a parameter relating to its operation;
   a module for modifying the parameter for the at least one application; the module operating on the electronic device, the module modifying the parameter by:
   upon activation of the device, determining a state of initial configuration for the device from configuration data stored in the device;
   if the state of initial configuration indicates that the device requires configuration, initiating the set up application and automatically generating
   a series of graphical user interface 'GUI' screens on a display of said device, said series of GUI screens providing introductory information relating to the device only on a first activation of the device;
   if a change is made to a parameter through the GUI interface, updating a storage location in memory of the device with the change;
   changing the state of initial configuration of the device after the set up application is activated on the device to reflect an operation history of the set up application; and
   if the state of initial configuration indicates that the set up application had previously been initiated, presenting a GUI where said at least one application and said set up application are presented and upon a subsequent activation of the set up application, activating said set up application at a point in its operation based on the operation history; and
   said memory to store the configuration data, the state of initial configuration and the record for the parameter.

12. The electronic device as claimed in claim 11, wherein the parameter relates to a display characteristic for elements generated on a display of the device.

13. The electronic device as claimed in claim 11, wherein:
   the device has COMA communication capabilities; and
   aspects of the GUI interface can be accessed only if a telephone number has been programmed into the device.

14. The electronic device as claimed in claim 11, wherein the GUI interface utilizes at least one template providing text to be displayed in a GUI screen and options relating to the parameter.

15. The electronic device as claimed in 14, wherein:
   the device has communication capabilities with a network; and
   time zone information relating to the location of the device is provided from the network; and
   the time zone information is used to update an aspect relating to the parameter.

16. A method of providing time information to a portable communication device, comprising the steps of:
   upon activation of the device, determining a state of configuration for the device from configuration data stored in the device;
   if the state of configuration indicates that the device requires configuration of an internally stored time value, deriving time zone information from location information relating to the device provided from a network communicating with the device;
   updating a parameter relating to an application that utilizes the time information;
   if the state of initial configuration indicates that the device requires configuration, initiating the set up application and automatically generating a series of graphical user interface 'GUI' screens on a display of said device, said series of GUI screens providing introductory information relating to the device only on a first activation of the device;

if a change is made to a setting through the GUI interface, updating a storage location in memory of the device with the change;

changing the state of initial configuration of the device after the set up application is activated on the device to reflect an operation history of the set up application; and if the state of initial configuration indicates that the set up application had previously been initiated, presenting a GUI where said at least one application and said set up application are presented and upon a subsequent activation of the set up application, activating said set up application at a point in its operation based on the operation history.

17. The method of providing time information to a portable communication device as claimed in claim 16, wherein the time zone information is derived using triangulation of signals received from the network by the device.

18. The method of providing time information to a portable communication device as claimed in claim 16, wherein:

country code data is associated with the device; and the method further comprises comparing the country code data to a preset time zone record provided with the device to determine a current time zone for the device.

* * * * *